United States Patent [19]

Nixon

[11] 4,186,947

[45] Feb. 5, 1980

[54] RADIAL COMPRESSION GASKET

[75] Inventor: Larry R. Nixon, Michigan Center, Mich.

[73] Assignee: Aeroquip Corporation, Jackson, Mich.

[21] Appl. No.: 876,682

[22] Filed: Feb. 10, 1978

[51] Int. Cl.² .............................................. F16L 17/04
[52] U.S. Cl. .................................... 285/112; 285/373
[58] Field of Search ............... 285/112, 373, DIG. 11; 277/206

[56] References Cited

U.S. PATENT DOCUMENTS

| | | | |
|---|---|---|---|
| 1,607,943 | 11/1926 | Carson et al. | 277/206 X |
| 3,134,612 | 5/1964 | Glasgow | 285/112 |
| 3,291,506 | 12/1966 | Blakeley | 285/112 |
| 3,351,352 | 11/1967 | Blakeley et al. | 285/112 X |

*Primary Examiner*—Dave W. Arola
*Attorney, Agent, or Firm*—Beaman & Beaman

[57] ABSTRACT

An elastomeric gasket for use with pipe coupled in end-to-end relationship wherein the coupling employs a split collar received within grooves within the pipe's circumference, the gasket being of a transverse cross section including deflectable lateral leg portions and a deformable central region. The leg portions include sealing surfaces engaging the pipe circumference, and the gasket configuration produces annular cavities between the central region and the leg portions in the normal relaxed gasket condition to permit the desired gasket deformation when compressed. The configuration and relationships of opposed adjacent surfaces of the leg portions and central region are such that when the gasket is under compression the cavities existing in the gasket when in the relaxed condition are totally eliminated by engaging gasket surfaces, and no voids exist in which foreign matter, water or fluids may be trapped.

6 Claims, 4 Drawing Figures

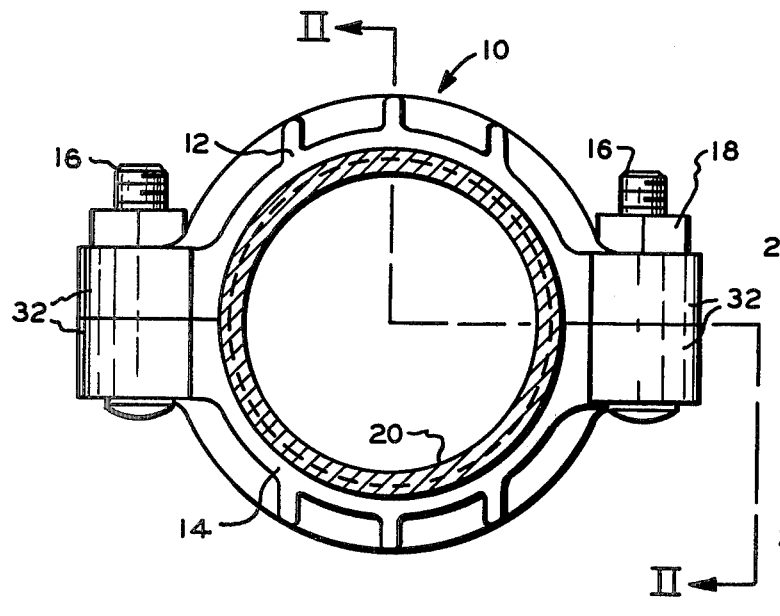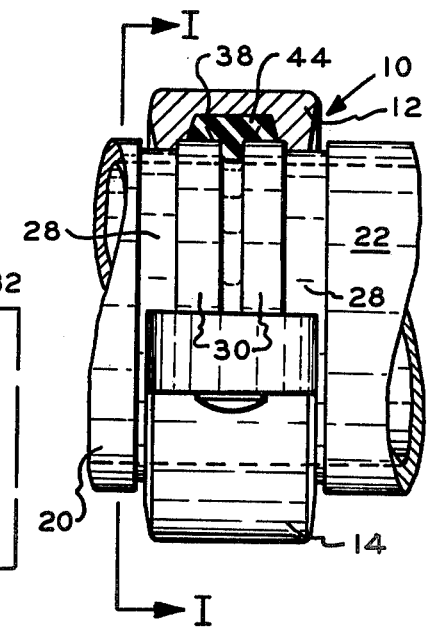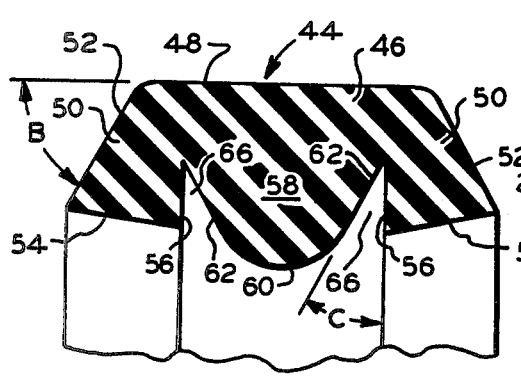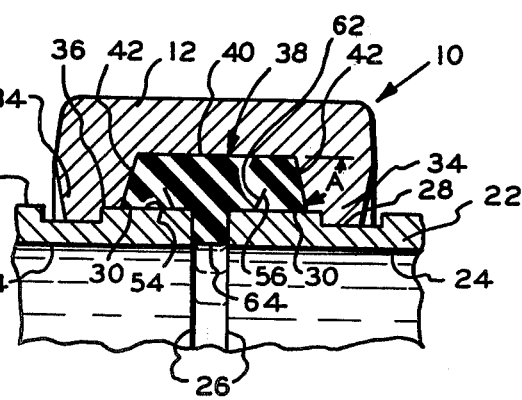

RADIAL COMPRESSION GASKET

BACKGROUND OF THE INVENTION

Pipe couplings utilizing split collars received within grooves defined in the pipe circumference and utilizing elastomeric gaskets to seal the pipe circumferences are often employed with larger diameter pipes in view of the ease of assembly and fabrication as compared with threaded couplings, for instance. Additionally, such couplings have the advantage of accomodating slight misalignment between coupled pipe sections without adversely affecting the seal.

Pipe couplings of this type normally employ a split collar having a recess defined therein for accomodating a continuous annular elastomeric gasket generally of a C-shape transverse cross section. Such gaskets permit the sealing surfaces thereof to engage the pipe circumferences, and the interior of the gasket is usually in communication with the pipe ends permitting the medium being conveyed to enter the gasket cavity.

Such gasket cavities are commonly known as the "well", and the ability of the medium to enter the gasket well will create problems if the pipe is being used in locations wherein freezing of a liquid medium within the well can take place as such freezing can cause a deformation of the gasket and create leakage. Further, as the medium within the gasket is in a trapped condition bacterial action on the medium therein can contaminate the pipe joint, and in conduit systems processing foods and the like such a condition is intolerable. Also, gaskets having wells create turbulance and an undesirable flow resistance and medium agitation.

In order to overcome the aforementioned deficiencies of this type of gasket having a well, elastomeric gaskets have been developed utilizing transverse cross sections wherein portions of the gaskets continue to function as annular seals to engage the pipe periphery, but the gasket also includes an inwardly extending region which cooperates and engages with the ends of the pipe to seal and fill the spacing between the opposed pipe ends, and minimize or substantially prevent entry of the medium beyond the configuration of the pipe. Such gaskets are often of a generally E-shaped transverse cross sectional configuration, and may include nonhomogeneous gasket seals and elements which assemble to the primary gasket.

While gaskets having portions sealing the ends of the pipe, or interposed between the pipe ends, have been previously developed, those gasket constructions presently commercially available are of such configuration that voids exist in the gasket when in a compressed state which are capable of entrapping fluids and foreign matter, and while it is necessary that, in the relaxed state, this type of gasket include lip portions and an inwardly extending central region, the configuration and relationships of the various gasket portions of the prior art are not such as to completely eliminate voids while the gasket is under compression. U.S. Pat. Nos. 3,291,506 and 3,351,352 disclose gaskets of the described type generally of an E-configuration wherein escape of the transported medium around the conduit ends and into the gasket configuration is minimized. However, each of these patents disclose configurations which result in small voids within the gasket when under compression, and the presence of these voids provides the opportunity for entrapping water, liquids, foreign matter, bacteria, and other undesirable elements within the gasket which may result in gasket damage under freezing conditions, or result in contamination of the transported medium.

SUMMARY OF THE INVENTION

It is an object of the invention to provide a gasket for use in coupling pipes in end-to-end relationship wherein the gasket fills the spacing between the opposed pipe ends and, in the compressed state, is free of voids and cavities.

Another object of the invention is to provide a gasket used in coupling pipe in end-to-end relationship wherein the gasket configuration produces sealing forces both in circumferential and longitudinal directions, and wherein the gasket central portion located between the pipe ends extends radially inwardly a distance substantially corresponding with the pipe wall thickness.

In the practice of the invention the elastomeric gasket transverse cross section includes a base portion from which inwardly extend lateral leg portions. Intermediate the leg portions, a central region extends inwardly, and the central region includes a convex portion merging from slope surfaces which intersect inner surfaces defining the inner portions of the leg portions. Thus, in the relaxed condition acute angle annular cavities are defined between opposed inner leg portion surfaces and the central region slope surfaces, and in the compressed condition these surfaces are in engagement to completely eliminate the cavities that exist in the relaxed condition.

The inward extension of the gasket central region is such that a radial compression occurs at the central region adjacent the pipe ends wherein a portion of the central region extrudes into the space between the pipe ends, and the configuration of the gasket leg portions is such that when the gasket is placed within the split collar recess sealing faces defined on the gasket sealingly engage the circumferences of the pipe adjacent the pipe ends with little or no compression. In the relaxed condition the leg portions are provided with an outer conical surface which intersects with the outer cylindrical surface of the gasket base portion, and the intersection of these surfaces defines an acute included angle. In the relaxed condition the inner leg region surfaces also define an acute included angle with the opposed slope surfaces, and in the preferred commercial embodiment the sum of these two included angles is approximately 90°. The preferred included angle between the outer surface of the leg portions and the gasket base surface is about 60°, while the included angle between the opposed slope surface and inner leg portion surface is approximately 30°.

BRIEF DESCRIPTION OF THE DRAWINGS

The aforementioned objects and advantages of the invention will be appreciated from the following description and accompanying drawings wherein:

FIG. 1 is a sectional view taken through a pipe coupling in accord with the invention along Section I—I of FIG. 2, FIG. 2 is an elevational view, partially in section, of a coupling in accord with the invention as taken along Section II—II of FIG. 1, FIG. 3 is an enlarged, detail, elevational sectional view taken through the gasket in accord with the invention as shown in the relaxed, unconfined form, and FIG. 4 is an enlarged, detail, sectional, elevational view of the split collar, gasket and pipe in accord with the invention showing the gasket in the compressed condition.

DESCRIPTION OF THE PREFERRED EMBODIMENT

A coupling of the type utilizing a gasket in accord with the inventive concepts employs a split coupling collar generally indicated at 10 consisting of halves 12 and 14. The collar halves are interconnected by threaded bolts 16 cooperating with nuts 18, and the collar is employed to interconnect a pair of pipes 20 and 22 in coaxial relationship.

The pipes 20 and 22 are of an exterior cylindrical configuration having a bore defined at 24, and the pipes are each formed with squared ends 26. Each of the pipes is provided with an annular groove 28 adjacent the cylindrical pipe end circumference surface 30, and this type of conventional pipe end configuration may be economically manufactured on turning equipment.

The couplings halves include ears 32 through which the bolts 16 extend, and as will be appreciated in FIGS. 2 and 4, the split collar configuration includes portions 34 received within the pipe grooves 28, and, in the disclosed embodiment, shouldered surfaces 36 are defined in the split collar halves to cooperate with the intersection surfaces of the pipe grooves and circumferences 30. The collar halves are also provided with an inwardly opening recess 38 defined by the cylindrical surface 40, and obliquely disposed surfaces 42. The acute included angle between surface 40 and a surface 42 as indicated at A in FIG. 4 is preferably approximately 75°.

The gasket 44 comprises an annular member having a continuous circumferential form and is constructed of an elastomeric material such as rubber, neoprene or the like. The particular material of the gasket may vary in accord with the composition of the medium transported by the pipe system, and in most instances the gasket will be formed of a rubber like material.

The relaxed or uncompressed form of the gasket is best appreciated from FIG. 3 wherein a transverse cross section is illustrated. The gasket comprises a body having a base region 46 defined by the cylindrical base surface 48. The lateral regions of the gasket are defined by leg portions 50 which extend inwardly from the base region 46 and are outwardly defined by outer leg side surfaces 52. The surfaces 52 are of a conical or tapered configuration and intersect the surface 48 at the acute included angle B, FIG. 3. Preferably, the angle B is approximately 60° when the gasket is in its relaxed state.

The leg portions 50 are inwardly defined by annular sealing lip or face surfaces 54, which in the relaxed state, are angularly related to the base surface 48. The inner portion of the leg portions 50 are defined by flat inner surfaces 56 which intersect the lip surfaces 54, and in the gasket relaxed state the surfaces 56 are substantially perpendicular to the base surface 48.

The gasket 44 includes a central region 58 which radially extends inwardly terminating in the convex surface 60 which comprises a circular segment. For instance, in a gasket wherein the axial dimension of the base surface 48 is approximately one inch, the surface 60 will be formed at a radius approximately 0.4 inches.

The inner portions of the central region 58 are defined by conical slope surfaces 62 which, at their innermost extent, intersect the opposed adjacent leg inner surface 56. The slope surfaces 62 tangentially merge with the radial surface 60, and it will be appreciated from FIG. 3 that the innermost portion of the surface 60 radially extends inwardly a greater distance than the innermost portion of the leg portions 50 as defined by the intersection of surfaces 54 and 56. As both inner leg portion surfaces 56 and the slope surfaces 62 are flat in transverse cross section this complementary shape of these surfaces permits these surfaces to tightly engage when the gasket is compressed, and the radial length of surfaces 56 and 62 are substantially equal to insure full engagement.

In the preferred embodiment of the gasket the acute included angle C defined intermediate opposed leg portion surfaces 56 and slope surfaces 62 is approximately 30°, and it will therefore be appreciated that the sum of the angles B and C, when the gasket is in the relaxed state, is approximately 90°.

In use, the gasket 44 is placed upon the end of a pipe 20 or 22 such that a surface 54 circumscribes a pipe circumferential surface 30. The other pipe is then brought into substantial alignment with the first pipe and the other gasket surface 54 placed upon the second pipe's surface 30. Thereupon, the halves of the split collar 10 may be placed over the ends of the pipe whereby the recesses 38 thereof will receive the gasket 44, and the collar portions 34 will engage the grooves 28 and the pipe shouldered surfaces 36 as apparent in FIGS. 2 and 4.

Because the recess angle A is greater than the relaxed gasket angle B the reception of the gasket 44 within the collar recesses 38 causes a pivoting of the leg portions 50 toward the central region 58, and the tightening of the bolts 16 will produce a radial compression at the central region within the gasket forcing the central region surface 60 into engagement with the pipe ends 26 and "extrude" the central region material into the spacing intermediate the pipe ends as best apparent from FIG. 4. Preferably, the degree of gasket deformation and extrusion at the pipe ends is such that the space between the pipe ends will be completely filled with gasket material from the central region 58 and the central region will terminate at a surface 64 which is in substantial alignment with the pipe's bores 24.

The configuration of the central region 58, and the dimensions of the gasket are such that when the gasket is fully compressed as shown in FIG. 4 the leg portion inner surfaces 56 will have moved toward the central region slope surfaces 62, and the slope surfaces 62 will have been deformed axially outwardly a slight extent such that the opposed surfaces 56 and 62 are now tightly engaging in line contact and the annular cavities 66 that previously existed between surfaces 56 and 62 have now been completely eliminated, and no voids exist in the gasket when in the compressed state. Thus, the complete absence of voids and cavities within the gasket precludes the possibility of water, liquids or other foreign matter from being entrapped in the gasket, and the gasket cannot serve as a source for contamination of the pipe system, which is most important in food processing applications.

The construction of the gasket in accord with the invention permits sealing by both circumferential and longitudinal compression, and the gasket in accord with the invention has superior anti-turbulent flow characteristics to those gaskets of similar type commercially available. The gasket construction does not require special configurations or high tolerance fabrication of the pipe ends, and the complete elimination of voids within the gasket when compressed eliminates many of the disadvantages of prior art devices.

It is appreciated that modifications to the inventive concept may be apparent to those skilled in the art without departing from the spirit and scope of the invention.

I claim:

1. A gasket for coupling grooved end pipe in end-to-end relationship comprising, in combination, an annular gasket member formed of resilient material having a transverse cross section including a base, lateral leg portions and a central portion intermediate said leg portions, said base and leg portions having outer cylindrical and conical coupling recess engaging surfaces, respectively, said leg portions each including an annular lip surface adapted to engage a pipe circumference intersected by an inner leg portions surface disposed toward said central portion, said central portion including an innermost bulbous convex surface merging from slope surfaces each in a spaced opposed relationship to an inner leg portion surface when said gasket is in a relaxed non-compressed condition whereby opposed inner leg portion and slope surfaces define annular cavities, said leg portions deflecting toward said central portion upon engaging a pipe circumference and the configuration of said opposed inner leg portion and slope surfaces being substantially planar in transverse cross section and of substantially equal radial length and intersect to define a first acute included angle when said gasket is in the relaxed state whereby compression of said gasket central portion in use engages said opposed inner leg portion and slope surfaces to completely eliminate said cavities and extrudes said central portion between the opposed ends of the pipe being coupled, said central portion bulbous convex surface being of such configuration and dimension to define a radial compression sealing surface on the pipes' circumferences adjacent the ends thereof to seal the regions of said engaging inner leg portions and slope surfaces.

2. In a gasket for coupling grooved end pipe as in claim 1 wherein said first acute included angle is approximately 30° when said gasket is in the relaxed state.

3. In a gasket for coupling grooved end pipe as in claim 1, wherein said base outer surface and said leg portions outer surfaces intersect and define second acute included angles when said gasket is in the relaxed state, the sum of said first and second included angles being approximately 90°.

4. In a gasket for coupling grooved end pipe as in claim 1 wherein said base outer surface and said leg portions outer surfaces intersect and define a second acute included angle of approximately 60°.

5. In a gasket for coupling grooved end pipe as in claim 3 wherein said first included angle is approximately 30° and said second included angle is approximately 60°.

6. In a gasket for coupling grooved end pipe as in claim 1 wherein said convex surface comprises a circular segment and said slope surfaces are tangential to said circular segment.

* * * * *